US011632315B1

(12) United States Patent
Sawai et al.

(10) Patent No.: US 11,632,315 B1
(45) Date of Patent: Apr. 18, 2023

(54) SYSTEM AND METHOD FOR DYNAMIC REPORTING BASED MANAGEMENT

(71) Applicant: Dell Products L.P., Round Rock, TX (US)

(72) Inventors: Vinay Sawai, Fremont, CA (US); Udhaya Chandran Shanmugam, Santa Clara, CA (US); Ashok Kumar Janardhana, Chennai (IN); Mahendaran Pagalpatti Vijayakumar, Chennai (IN); Ramya Ramachandran, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/579,173

(22) Filed: Jan. 19, 2022

(51) Int. Cl.
*H04L 43/067* (2022.01)
*H04L 41/50* (2022.01)
*H04L 67/51* (2022.01)

(52) U.S. Cl.
CPC ............ *H04L 43/067* (2013.01); *H04L 41/50* (2013.01); *H04L 41/5032* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 9,864,417 B2 | 1/2018 | Bermudez Rodriguez et al. | |
| 2009/0059812 A1* | 3/2009 | Chinnaswamy | H04L 41/5061 370/253 |
| 2011/0211465 A1* | 9/2011 | Farrugia | H04M 15/853 370/252 |
| 2017/0264509 A1* | 9/2017 | Wanser | H04L 43/08 |
| 2018/0324027 A1* | 11/2018 | Kondapi | H04L 41/046 |
| 2020/0057686 A1* | 2/2020 | Huang | G06F 11/0709 |

OTHER PUBLICATIONS

Austin House "InfraSolution" Catalog, published by Austin Hughes Electronics Ltd. on Nov. 29, 2020; available online at http://web.archive.org/web/20200810192944/https://www.austin-hughes.com/resource_cat/product-resources/rack-access-resources/.

(Continued)

*Primary Examiner* — Joshua Joo
(74) *Attorney, Agent, or Firm* — Womble Bond Dickinson (US) LLP

(57) ABSTRACT

Methods, systems, and devices for providing computer implemented services using managed systems are disclosed. To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services. To improve the likelihood of the computer implemented services being provided, the managed devices may be managed using a dynamic reporting model. The dynamic reporting model may facilitate reduction and increasing in computing resources used for reporting dynamically as the operation of the managed system change. The dynamic reporting model may be used to limit overhead for reporting.

20 Claims, 10 Drawing Sheets

(56) References Cited

OTHER PUBLICATIONS

Wikipedia "Path MTU Discovery" Article, published by Wikipedia on Nov. 19, 2021 available Online at http://web.archive.org/web/20211119214201/htttps://en.wikipedia.org/wiki/Path_MTU_Discovery.

Tripplite "Rack Basics: Everything You Need to Know Before You Equip Your Data Center" Article, published on May 15, 2021; available online at http://web.archive.org/web/20210515085036/https://www.tripplite.com/support/rack-cabinet-basics-selection-installation-cooling.

* cited by examiner

SYSTEM AND METHOD FOR DYNAMIC REPORTING BASED MANAGEMENT

FIELD DISCLOSED HEREIN

Embodiments disclosed herein relate generally to system management. More particularly, embodiments disclosed herein relate to systems and methods to manage reporting in distributed systems.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
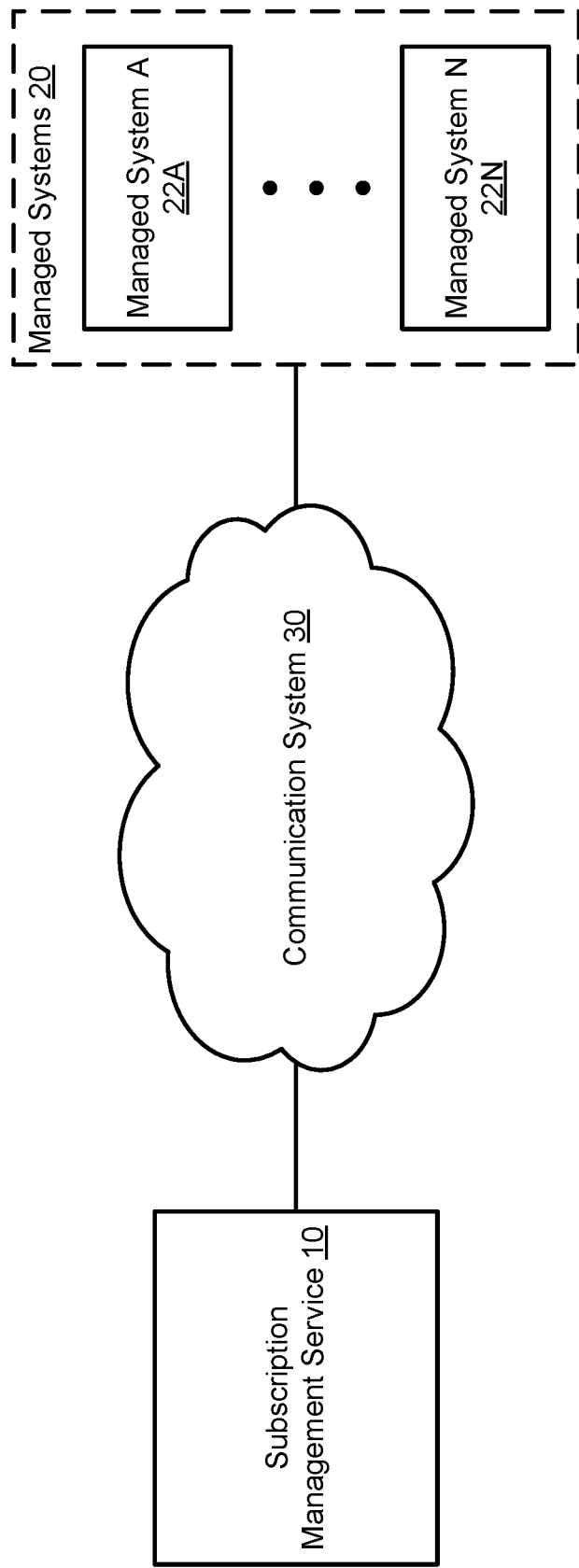
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services.

To improve the likelihood of the computer implemented services being provided, embodiments disclosed here relate to methods and systems for managing managed devices using a subscription based model. The subscription model may utilize a highly accessible service to obtain information regarding desired capabilities (e.g., a subscription) of a managed system, use the acquired information to automatically configure and manage the features and capabilities of managed systems to meet those desired by users, operators, and/or other persons, and facilitate usage based management of the managed systems.

To facilitate usage based management of the managed systems, a dynamic use data reporting model may be utilized. The dynamic use data reporting model may balance the overhead for performing use data reporting against the utility of the reported use data in management of the managed systems. For example, the disclosed system may prioritize reporting during period of time when subscriptions are more likely to be exceeded and overhead conservation when subscriptions are less likely to be exceeded.

By doing so, the managed devices may be more likely to be able to provide the computer implemented services actually desired by users over time (e.g., by avoiding subscription limitations being reached) while reducing the overhead for reporting use data thereby increasing the capacity for providing computer implemented services. Thus, embodiments disclosed herein may address challenges in distributed systems that may utilize some degree of inter-device communication for coordination. The disclosed system may provide an architecture that better marshals limited resources of the managed systems.

In an embodiment, a computer-implemented method for managing a distributed system comprising managed systems and a subscription manager that manages operation of the managed systems is provided. The method may include performing intermittent reporting, by a first managed system of the managed systems, use of the first managed system to the subscription manager using a first reporting time interval to provide reports of the use of the first managed system; while performing the intermittent reporting: monitoring, by the first managed system, a rate of the use of the first managed system and a total quantity of use of the first managed system; modifying, by the first managed system, the first reporting time interval based on the rate of the use of the first managed system and the total quantity of use of the first managed system to obtain an updated first reporting time interval used to perform the intermittent reporting, the updated first reporting time interval increasing or decreasing time between the reports of the use of the first managed system; obtaining, by the first managed system, a subscription update for a subscription, the subscription update being responsive to the intermittent reporting; and modifying, by the first managed system, operation of the first managed system based on the subscription update.

Modifying the first reporting time interval may include, while the total quantity of use of the first managed system is within a subscription limitation of the subscription: decreasing the first reporting time interval to obtain a decreased first reporting time interval in response to corresponding increases in the rate of the use of the first managed system to increase a computing resource expenditure associated with the reports of the use of the first managed system; and increasing the first reporting time interval to obtain an increased first reporting time interval in response to corresponding decreases in the rate of the use of the first managed system to decrease a computing resource expenditure associated with the reports of the use of the first managed system.

Modifying the first reporting time interval may also include, while the total quantity of use of the first managed system is in a range associated with the subscription limitation of the subscription: modifying the first reporting time interval to obtain a modified first reporting time interval to meet a predetermined reporting rate regardless of the rate of the use of the first managed system to provide reports of the use of the first managed system at the predetermined reporting rate.

The subscription limitation may specify an authorized quantity of the use of the first managed system based on the subscription, and the range may be based on quantities of use of the first managed system that indicate that the subscription limitation is likely to be exceeded.

The modified first reporting time interval may reduce a likelihood that the subscription manager is unable to predict when the subscription limitation is likely to be exceeded due to the first reporting time interval.

Modifying the first reporting time interval may include reducing the first reporting time interval to a minimum reporting interval.

The intermittent reporting may be performed by an out-of-band management controller hosted by the first managed system, the out-of-band management controller managing functionality of the first managed system accessible by a user based, at least in part, on the subscription. The out-of-band management controller may operate independently from the first managed system.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
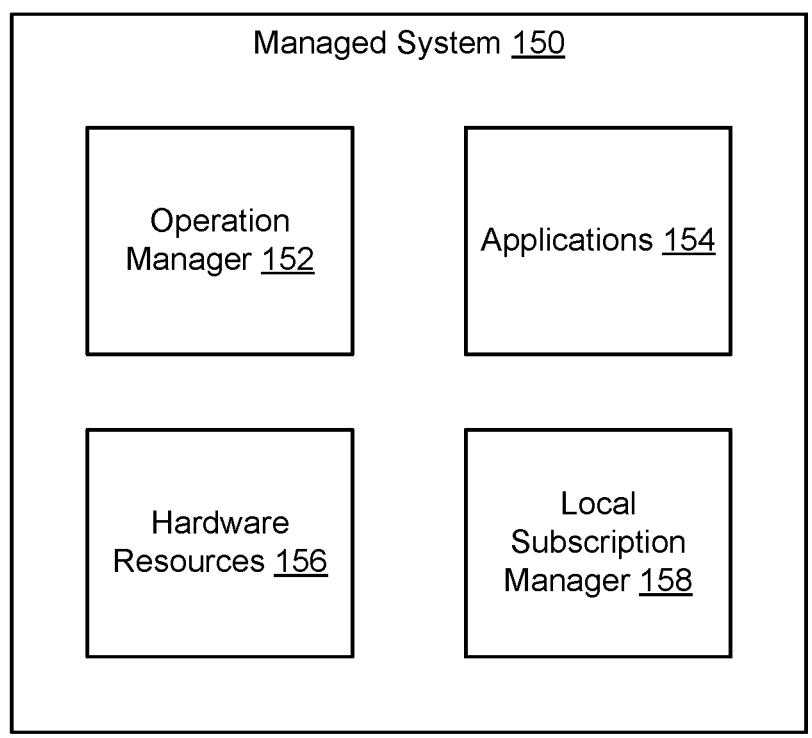
FIG. 1B shows a block diagram illustrating a managed device in accordance with an embodiment.

To provide the aforementioned computer implemented services, any of managed systems 22A, 22N may need to operate in a predetermined manner. For example, certain hardware components may need to be operational and/or certain software components (e.g., applications) may need to be operating for the managed systems to provide computer implemented services (e.g., to operate as a solution). Different configurations of the hardware components and/or applications may need to be implemented by managed systems 20 depending on the computer implemented services desired to be provided by the respective managed systems. Refer to FIG. 1B for additional details regarding managed systems 20.

However, determining these configurations of hardware and/or software components (e.g., applications) necessary for corresponding computer implemented services may be technically challenging to identify. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services. To do so, a system in accordance with embodiments disclosed herein may provide a distributed system for automatically identifying and implementing hardware and/or software configurations of managed systems to support desired computer implemented services. By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services.

To provide the above noted functionality, a system in accordance with an embodiment may include subscription management service 10. Subscription management service 10 may facilitate automatic configuration of managed systems 20. To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/software components), (ii) correlate the desired functions with various hardware components (e.g., if explicit hardware components identifications are not made) and/or software components, and (iii) provide local subscription managers hosted by managed systems 20 with information regarding the identified hardware components, software components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may configure managed systems 20 without needing to directly interact with the various hardware and/or software components of managed systems 20.

Further, the distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20. Consequently, through subscription management service 10, a user of managed systems 20 may only provision those function, services, etc. that the user actually desires to utilize.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc. The contractual basis may be, for example, durations of time, use of certain quantities of resources such as processor cycles, storage space, etc. and/or aggregate services provided by one or more managed systems.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information).

To enable clients to effectively manage financial cost, available capacity, and/or other features provided through managed systems 20, subscription management service 10 may provide information regarding the use (e.g., by users that have elected subscriptions) of managed systems 22A-22N, information regarding current subscriptions, alerts or notifications when subscription limitations and/or use of the managed systems indicating that the client may desire to make changes to their subscriptions, and/or other types of information usable by clients to manage their respective uses of managed systems 20. For example, subscription management service 10 may provide graphical user interfaces to user of clients to allow the clients to (i) modify their subscriptions, (ii) pre-authorize changes in subscriptions, and/or (iii) otherwise facilitate communications between user of clients and subscription management service 10. By doing so, users of managed systems 20 may, through such interfaces, dynamically manage their subscriptions as their use of managed systems 20 changes over time.

For example, consider a scenario where a business organization contracts with a company to receive database services to manage sales data. A user from the business organization (e.g., an internet technology manager or other person) may use the interfaces provided with subscription management service 10 to elect to receive database services. Based on the subscription election for database services, subscription management service 10 may automatically select and configure all, or a portion, of managed system 20 to provide the database services by, for example, (i) enabling/disabling hardware devices of managed systems 20, (ii) load and/or remove various applications, firmware, and/or other types of software, (iii) apply configuration settings to hardware devices and/or software, and/or (iv) perform other types of actions to facilitate provisioning of the database services.

Once the database services are being provided, managed systems 20 may report use of the database services to subscription management service 10. Doing so, may allow subscription management service 10 to notify the business organization of their use of the services (e.g., which may incur financial cost and may require modifications in subscription to manage cost), approaching limits (e.g., transaction rate limits based on elected subscriptions, storage space limits based on elected subscription, etc.), and/or reached limits that are impacting the quality of the services received by the business organization.

However, reporting use data to subscription management service 10 may incur substantial computational overhead. For example, in some scenarios, a managed system may be used by many different users thereby placing a significant computational load in generating reports of use (e.g., use data) by the users, and may consume significant communication resources (e.g., network bandwidth, packet slots, etc.) for distributing the use data to subscription management service 10.

Further, the users of managed systems 20 may desire to have access to up to date information regarding their use of managed systems 20. For example, the users may use such information to make decisions regarding subscriptions which may have significant financial cost implications if such subscriptions are not timely elected. If the use data presented to users of managed systems 20 is stale (or otherwise not current enough to avoid incremental cost or other undesirable outcomes due to subscription limitations being exceeded), then the users may be unable to make proactive, informed decisions regarding their subscriptions to maintain access to the desired services provided by managed systems 20. For example, exceeding a subscription limitation may result in (i) loss of access to services/managed systems, (ii) decreased quality of services provided by managed systems, (iii) incremental cost that may be based on exceeded subscription limitations (e.g., such as incremental cost associated with use after a total quantity of use subscribed to by a user for a fixed financial cost has been exceeded), etc.

To facilitate management of managed systems 20, managed systems 20 may dynamically modify rates of reporting use data (e.g., intermittent reports) to subscription management service 10. The rates of reporting use data may be dynamically modified to reduce overhead for use data reporting while such dynamic modifications are unlikely to cause users of managed systems to unexpected exceed their subscriptions. For example, the interval between reports may be increased when the rate of use of a managed system decreases and the interval between reports may be decreased when the rate of use of the managed system increases.

When dynamic modifications may cause users of managed systems to unexpectedly exceed their subscriptions, the rates of reporting use data may be set to ensure that users of the managed systems are aware of their use of the managed systems. For example, the interval (e.g., a reporting time interval) between reports may be decreased to a minimum reporting interval so that subscription management service 10 may have access to the most up to date information regarding use of managed systems 20. The interval may be set to the minimum reporting interval regardless of the rates of use of the managed systems.

For example, even if the rate of use of a managed system is very low (e.g., which would otherwise result in increased time between use data reports), the interval between reports may be set to the minimum reporting interval if the total use of the managed system is in a range that indicates that a subscription limitation based on the total use of the managed system may be exceeded.

Subscription management service 10 may utilize the reported use data to information users of the use of managed systems, as noted above. The users of managed systems may update their subscriptions responsive to the reported use of the managed systems. Subscription management service 10 may update the subscriptions accordingly which may result in the updated subscriptions not being exceeded. For additional details regarding subscription management service 10, refer to FIG. 1D.

By doing so, embodiments disclosed herein may provide a distributed system management model that efficiently marshals limited resources to improve the likelihood that users of the managed systems are able to receive the services that they actually desire to utilize. Consequently, the disclosed distributed systems may provide computer implemented services to users that better reflect that actual desires of the users of managed systems 20.

Any of subscription management service 10 and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10 and managed systems 20 are operably connected via communication system 30. Communication system 30 may allow any of subscription management service 10 and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A.

Figure 5:
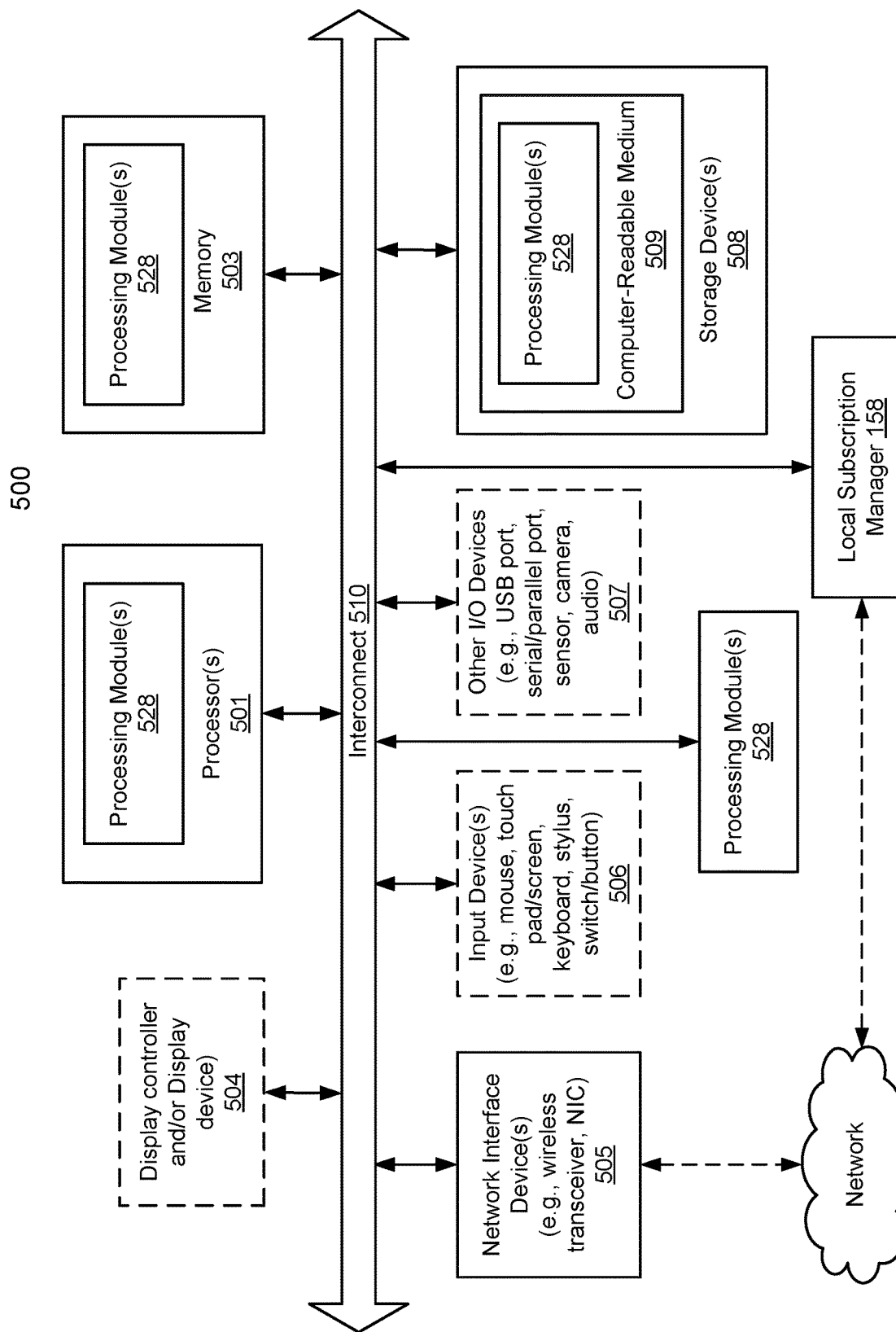
FIG. 5 shows a block diagram illustrating a computing device in accordance with an embodiment.

In addition (and/or alternatively) to any of the components shown in FIG. 5, managed system 150 may include operation manager 152, applications 154, hardware resources 156, and local subscription manager 158. Each of these components is discussed below.

Operation manager 152 may generally manage operation of the component of managed system 150, except for local subscription manager 158. For example, operation manager 152 may be implemented with an operating system used to manage hardware resources 156 of managed system 150 to facilitate execution of applications 154. Operation manager 152 may also include, for example, a startup manager such as a basic input output system (BIOS) used to prepare managed system 150 to boot to an operating system or other type of operation management entity. For example, the startup manager may perform various administrative functions such as (i) identifying the hardware resource 156 and (ii) preparing the hardware resources 156 for use. Once prepared, the startup manager may handoff management of managed system 150 to the operating system or other type of management entity to place managed system 150 in a predetermined operating system conducive to applications 154 providing their functionalities. Prior to hand off, managed system 150 may not be in an operating state in which applications 154 may provide all, or a portion, of their functionalities.

Applications 154 may provide all, or a portion, of the computer implemented services desired by a user, operator, or other person associated with managed system 150. Applications 154 may utilize hardware resources 156 to provide their respective functionalities. Operation manager 152 may mediate presentation of hardware resources 156 by, for example, scheduling use, managing discontinuous access, and/or performing other actions to coordinate use of hardware resources 156 by applications 154 (and/or other entities).

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions) to obtain, for example, use data, (v) dynamically modifying reporting rates of use data to manage computing resource overhead while avoiding loss in the fidelity of the information provided to users of managed system 150 regarding their use of managed system 150, (vi) providing use data to the subscription management service, and (vii) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) activing various deactivated hardware resources, (b) loading various information into storage and/or memory of managed system 150, (c) causing processors or other devices of hardware resources 156 to execute various code blocks to cause them to perform certain operations, and/or (d) any other types of actions to implement changes to managed system 150 to comply with a subscription. Likewise, the one or more actions to force managed system 150 to comply with the subscriptions may include (I) disabling various activated hardware resources, (II) removing various information from storage and/or memory of managed system 150, (III) causing processor or other devices of hardware resources 156 to execute other code blocks to cause them to perform certain operations to revert previous changes to the operation of managed system 150 and/or remove certain functionalities, and/or (IV) any other types of actions to implement changes to managed system 150 to comply with a subscription or lack thereof.

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150. Local subscription manager 158 and subscription management service 10 may also perform one or more authentications of one another and/or communications from these components to prevent other entities from interfering with the cooperative operation of local subscription manager 158 and subscription management service 10.

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to disable/enable components, reconfigure components, add new components (e.g., load additional applications for execution), etc. Further, the management controller may include functionality to monitor the operation of these components to measure use of managed system 150 by various users.

In an embodiment, the management controller includes a separate communication interface (e.g., from that of a communication interface of managed system 150) through which it communicates with subscription management service 10. In an embodiment, the management controller uses the same communication interface which managed system 150 uses to communicate with other devices. Either of these communication interface may facilitate communications with communication system 30, and devices connected to communication system 30.

Figure 1C:
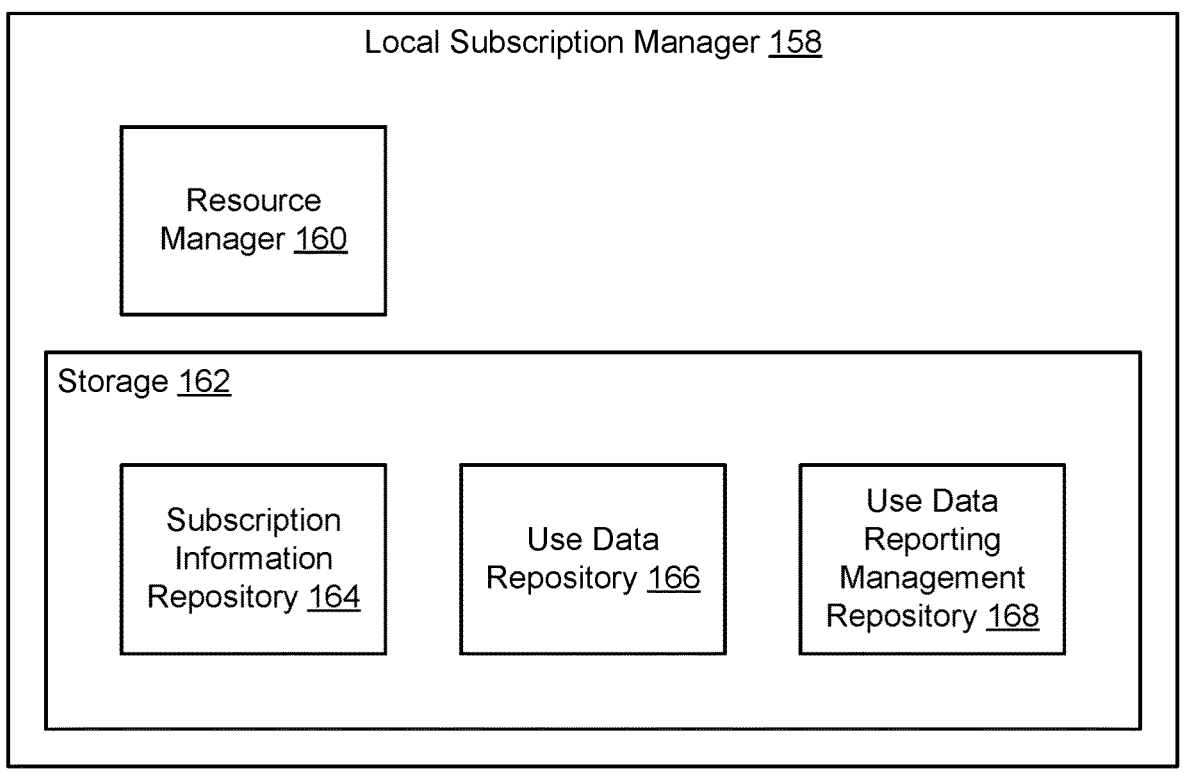
FIG. 1C shows a block diagram illustrating a local subscription manager in accordance with an embodiment.
Figure 2:
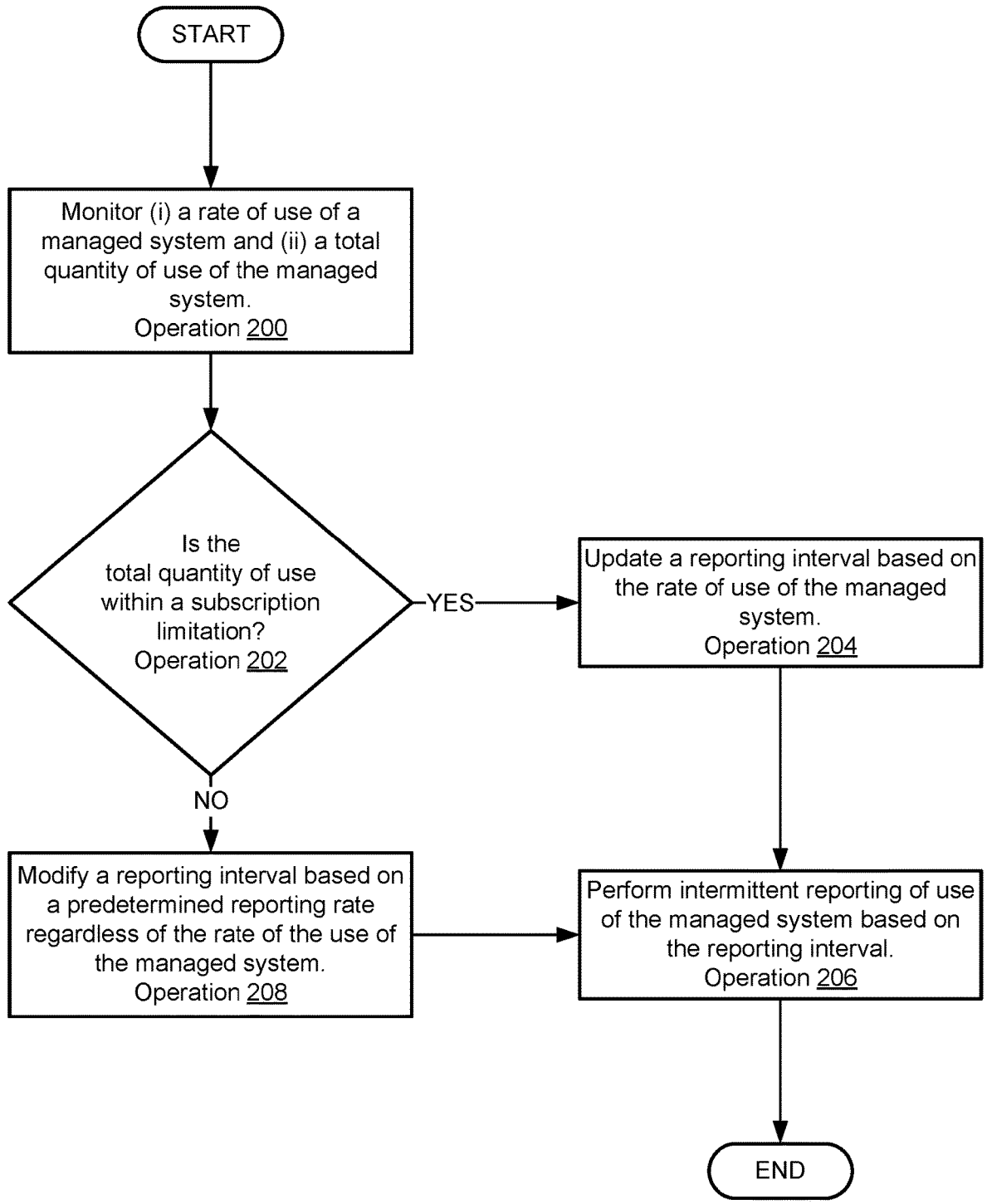
FIG. 2 shows a flow diagram illustrating a method of dynamically selecting reporting intervals to facilitate managed system management in accordance with an embodiment.
Figure 3:
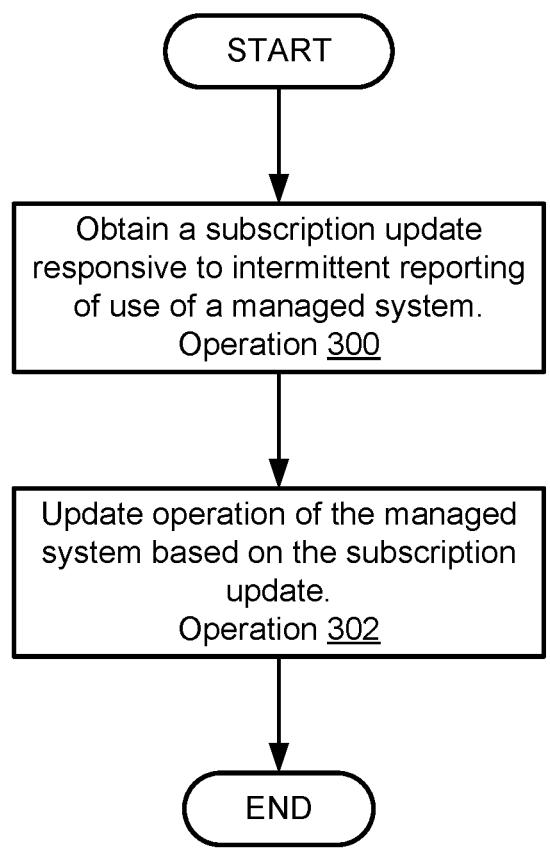
FIG. 3 shows a flow diagram illustrating a method of managing operation of managed system in accordance with an embodiment.
Figure 4A:
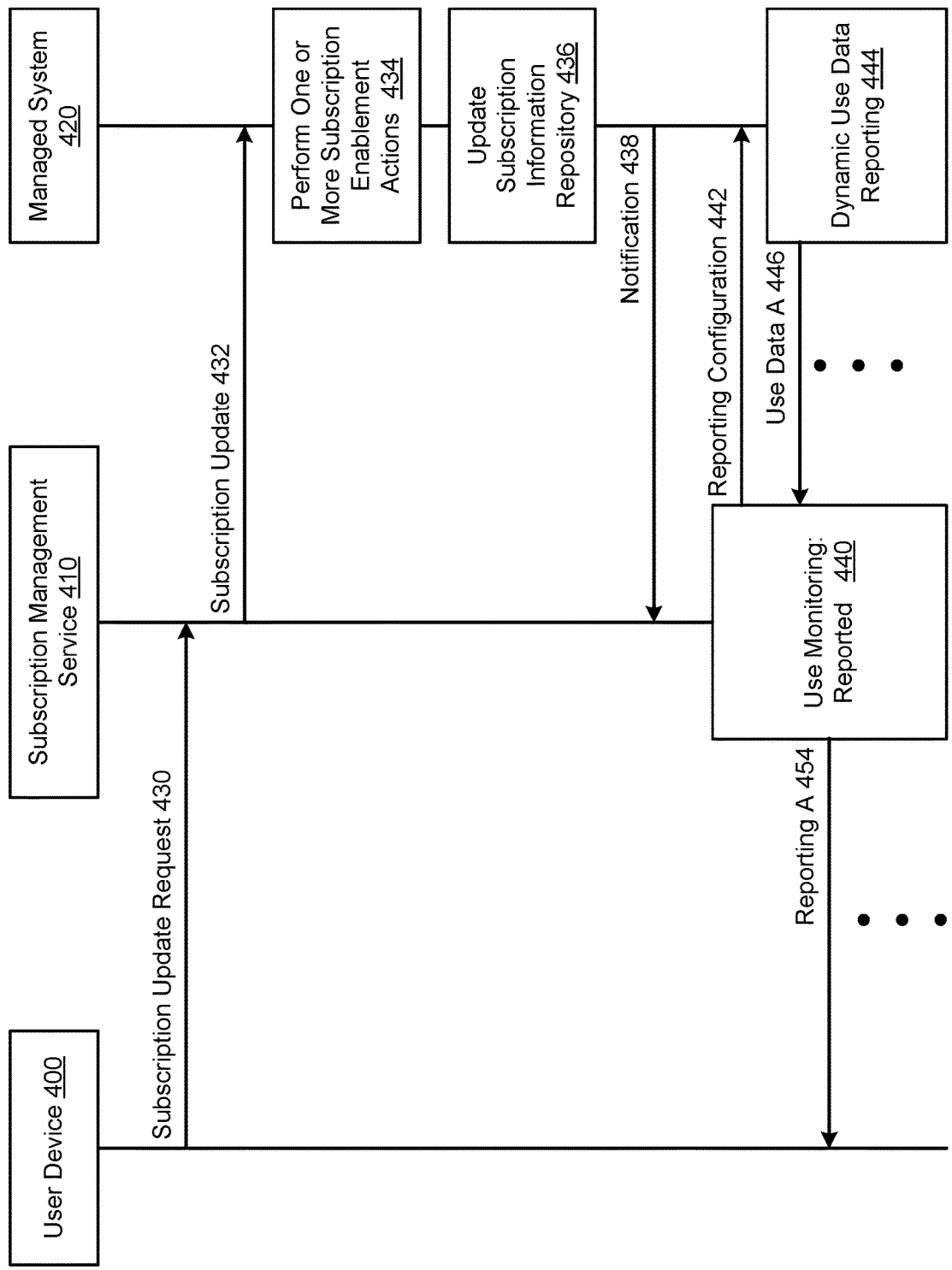
FIGS. 4A-4B show diagrams illustrating interactions between and actions of components of a system in accordance with an embodiment.
Figure 4B:
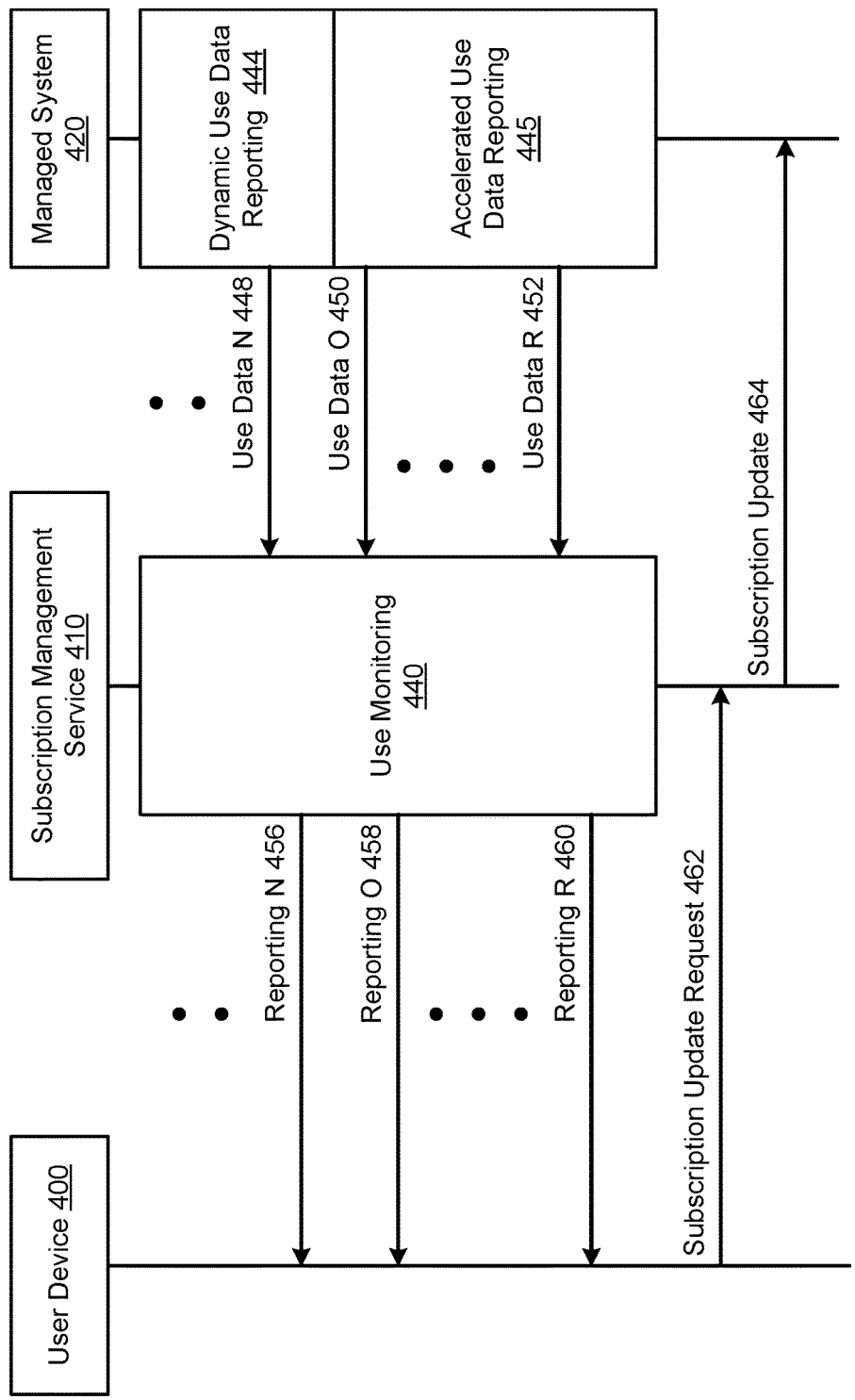
Figure 4C:
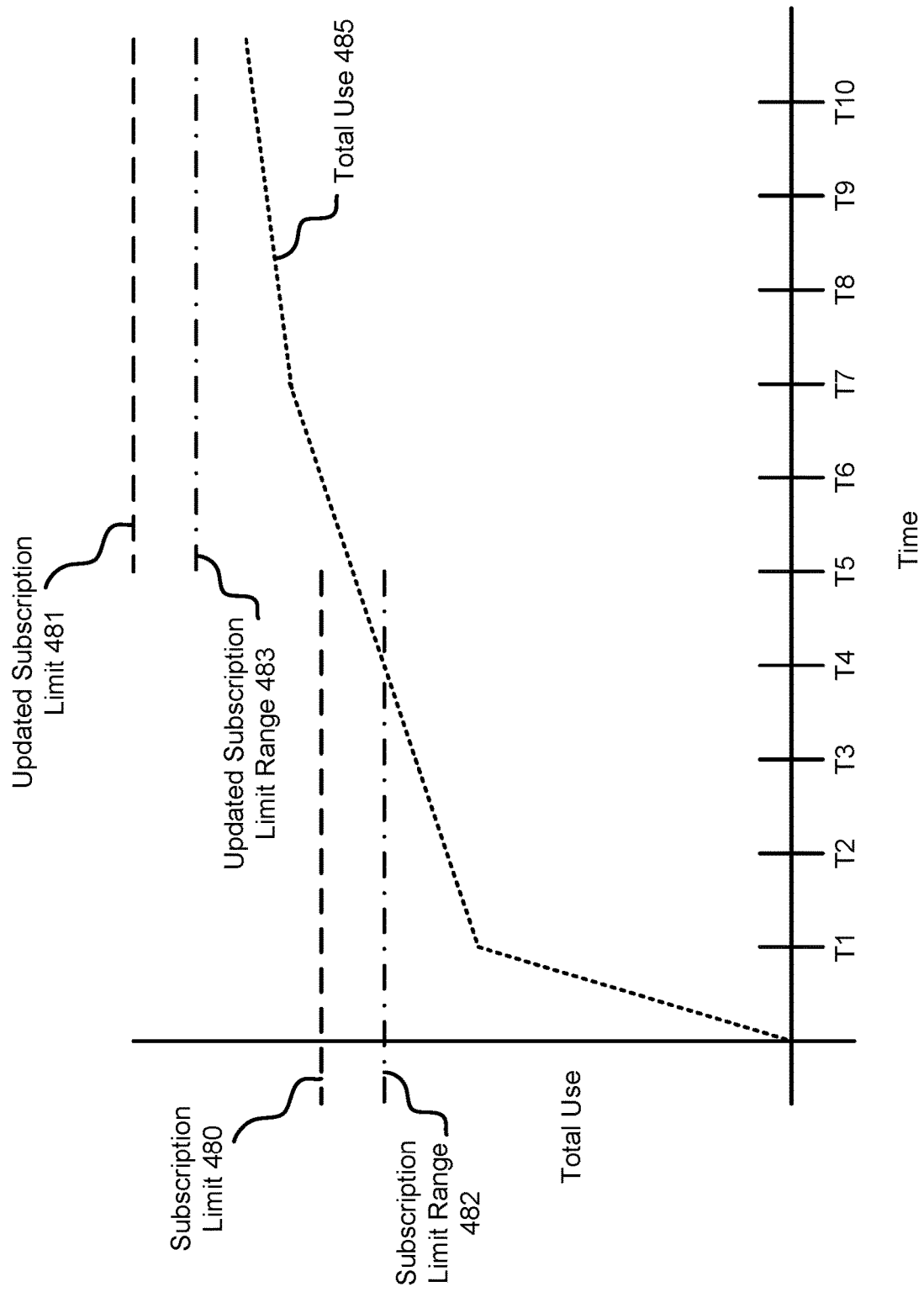
FIG. 4C shows a plot illustrating use data used by the system of FIGS. 4A-4B in accordance with an embodiment.

When providing its functionality, local subscription manager 158 may perform all, or a portion, of the methods and operations illustrated in FIGS. 2-3 and/or actions shown in and/or described with respect to FIGS. 4A-4C. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include resource manager 160 and storage 162. Each of these components is discussed below.

Resource manager 160 may include functionality to (i) establish secure connections with and/or authenticate subscription management service 10, (ii) obtain information from subscription management service 10 via the secure connections, (iii) update subscription information repository 164 based on the obtained information, (iv) modify the configuration, function, and/or operation of a managed system that hosts local subscription manager 158 to conform to the information stored in subscription information repository 164, (v) monitor use of subscribed to services provided by the host managed system, (vi) report the use of such services provided by the host managed system to the subscription management service, and (vii) dynamically modify reporting intervals to reduce computing resource overhead while maintaining fidelity of the reported information.

In an embodiment, resource manager 160 dynamically modifies the reporting intervals between reports based on (i) (e.g., changes in) rates of use of a host managed system, (ii) total quantities of use of the host managed system, and (iii) subscription limitations (e.g., which may specify finite quantities of use of the host managed system). The subscription limits may be specified via any type and quantity of metrics (e.g., use of services, use of hardware components, time based, rate based, instance based, etc.). While a subscription is unlikely to be exceeded, resource manager 160 may dynamically increase and/or decrease reporting intervals based on the rates of the use of managed systems. For example, as the rates of use increases, the reporting intervals may decrease. In contrast, as the rates of use decreases, the reporting intervals may increase. By doing so, overhead may be reduced when more granular reporting may be unnecessary to accurately represent the state of the use of managed system 150 while ensuring that more granular reporting is implemented when it may be necessary to accurately represent the state of the user of managed system 150.

While a subscription is more likely to be exceeded, resource manager may automatically modify the reporting intervals by reducing them to a minimum reporting interval (e.g., that may be implemented by local subscription manager 158). The modification may be made exclusively based on comparisons between subscription limitations and corresponding characteristics regarding the operation of managed system 150. For example, if the subscription limitation specifies that only a finite total quantity of use of managed system 150 is allowed with the subscription, then the total quantity of use may be compared to the finite total quantity of use to ascertain whether subscription limitations of the subscription are more likely to be exceeded. A range, based on the subscription limitation, may be used to make the determination such that it may be determined that the subscription limitations are likely to be exceeded ahead of the subscription limitations actually being exceeded.

When it is determined that the subscription limitations are more likely to be exceeded, the reporting interval may automatically be modified so that use data is more frequently reported to the subscription management service (e.g., more frequently than would be reported if only the rate of use is used to dynamically select the reporting intervals). Consequently, even while a rate of use of managed system 150 may indicate that the reporting interval should be long to reduce computational overhead, the reporting interval may be decreased due to the risk of a subscription being exceeded. The reduced reporting interval may ensure that user of managed system 150 are able to ascertain their risk of exceeding the limits of their subscriptions. Accordingly, the user may proactively take action (e.g., by authorizing responsive subscription updates) ahead of actually exceeding a subscription thereby avoiding or reducing the impact of exceeding subscriptions.

While providing its functionality, resource manager 160 may perform all, or a portion, of the methods shown in FIGS. 2-3 and actions shown in FIGS. 4A-4C.

In an embodiment, resource manager 160 is implemented using a hardware device including circuitry. The hardware device may be, for example, a digital signal processor, a field programmable gate array, or an application specific integrated circuit. The circuitry may be adapted to cause the hardware device to perform the functionality of resource manager 160. Resource manager 160 may be implemented using other types of hardware devices without departing embodiment disclosed herein.

In one embodiment, resource manager 160 is implemented using a processor adapted to execute computing code stored on a persistent storage that when executed by the processor performs the functionality of resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a managed system that hosts local subscription manager 158.

Storage 162 may store data structures including subscription information repository 164, use data repository 166, and use data reporting management repository 168.

Subscription information repository 164 may be implemented with one or more data structures that store information regarding subscriptions for a device that hosts local subscription manager 158. The information may allow resource manager 160 to enforce various configurations on a host managed system to conform that operation of the host managed system to meet subscription limitations. For example, subscription information repository 164 may include code blocks usable to force a host managed system (e.g., by initiating execution of the code blocks) to enable/disable various hardware components, software components, adopt various configurations, and/or otherwise conform its operation to that necessary for desired computer implemented services to be provided. Subscription information repository 164 may also indicate corresponding subscription limitations that may trigger use of code blocks (e.g., when subscription limitations are exceeded).

Use data repository 166 may be implemented with one or more data structures that store information regarding use of the services provided by the host managed system. The use data may include quantities of services utilized by a user (e.g., absolute quantities, use rates, and/or other types of information regarding use of such services by subscribed entities), quantities of computing resources consumed by services provided to a user, and/or other information usable to quantify use of a host managed system or services provided by the host managed system. The information included in use data repository 166 may be maintained by resource manager 160 which may monitor the operation of a host managed system to obtain the information.

Use data reporting management repository 168 may be implemented with one or more data structures that store information regarding how use data is to be reported to a subscription management service. Use data reporting management repository 168 may include lists of reporting intervals to be used while different use rates of services are observed by resource manager 160. The lists may be used as lookup data structures. Generally, the lists may indicate increased reporting intervals as the rate of use of a host managed system decreases, and decreased reporting intervals as the rate of the use of the host managed system increases.

Use data reporting management repository 168 may also include information regarding subscription limitations, ranges corresponding to the subscription limitations, and corresponding reporting intervals to use when the use of a host managed system is within the ranges. For example, the reporting intervals may be minimum reporting intervals such that the use data is reported as frequently as possible. The ranges may be based on the corresponding subscription limitations. For example, some of the subscription limitations may be threshold values (e.g., total use based) that if exceeded indicate that the subscription limitation has been reached. The range may be some fraction or numeral range based on the values of the thresholds. For example, if a threshold value is 100, a range may be 10% of the threshold value extending from the threshold value into the region that is within the limitation. If the subscription limitation is, for example, 0-100, then, in this scenario, the range may be 90-100. Thus, if the total use of a corresponding managed systems reached 90, then resource manager 160 may begin to use the corresponding reporting intervals (e.g., may do so regardless of the values of other metrics which may indicate longer reporting intervals).

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Figure 1D:
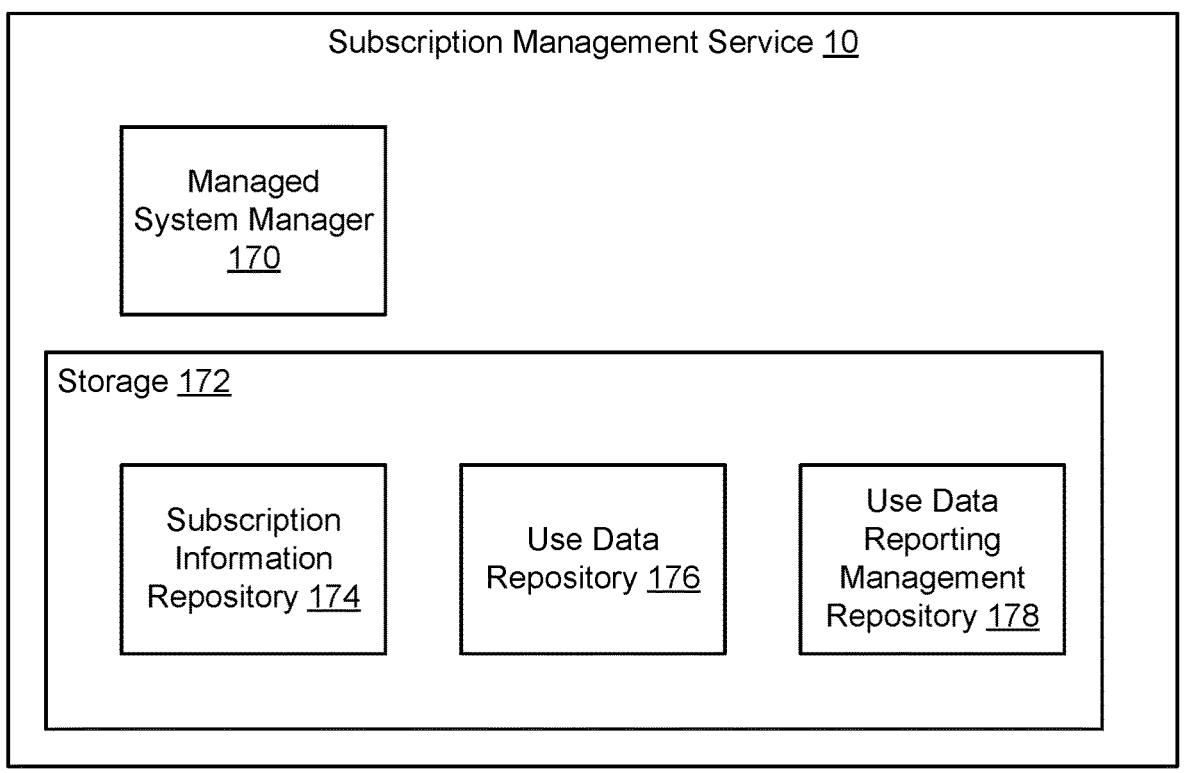
FIG. 1D shows a block diagram illustrating a subscription management service in accordance with an embodiment.

Turning to FIG. 1D, a block diagram of subscription management service 10 in accordance with an embodiment is shown. As discussed above, subscription management service 10 may manage the operation of managed systems based on subscriptions. To provide its functionality, subscription management service may include managed system manager 170 and storage 172. Each of these components is discussed below.

Managed system manager 170 may include functionality to (i) obtain subscription information for various users of managed systems (e.g., an use the subscription information to managed various managed systems), (ii) provide information regarding use of the managed systems by the user to the users, (iii) provide the users of the managed systems regarding their use of the managed systems, and/or (iv) automatically and/or at the direction of user of managed systems, modify subscriptions for the users to improve the likelihood that the managed systems provide computer implemented services desired by user of the managed systems.

To provide information regarding use of managed systems to the users, managed systems may report the use of the respective managed system to managed system manager 170. Managed system manager 170 may store such information in use data repository 176 and prove information to the users of the managed system regarding their use using the information included in the repository.

Based on the reported information, users may provide subscription updates to avoid reaching subscription limitations. In response to such subscription updates, managed system manager 170 may implement the subscription updates using local subscription managers of the corresponding managed systems.

When providing its functionality, managed system manager 170 may perform all, or a portion of the methods of FIGS. 2-3 and/or the actions illustrated in and/or described with respect to FIGS. 4A-4C.

In an embodiment, managed system manager 170 is implemented using a hardware device including circuitry. The hardware device may be, for example, a digital signal processor, a field programmable gate array, or an application specific integrated circuit. The circuitry may be adapted to cause the hardware device to perform the functionality of managed system manager 170. Managed system manager 170 may be implemented using other types of hardware devices without departing embodiment disclosed herein.

In one embodiment, managed system manager 170 is implemented using a processor adapted to execute computing code stored on a persistent storage that when executed by the processor performs the functionality of managed system manager 170 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 172 is implemented using physical devices that provide data storage services (e.g., storing data and providing copies of previously stored data). The devices that provide data storage services may include hardware devices and/or logical devices. For example, storage 172 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 172 may include a memory device (e.g., a dual in line memory device) in which data is stored and from which copies of previously stored data are provided. In another example, storage 172 may include a persistent storage device (e.g., a solid-state disk drive) in which data is stored and from which copies of previously stored data is provided. In a still further example, storage 172 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 172 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 172 may store data structures including subscription information repository 174, use data repository 176, and use data reporting management repository 178.

Subscription information repository 174 may be implemented with one or more data structures that store information regarding subscriptions agreed to by various users. For example, subscription information repository 174 may indicate (i) agreed to subscriptions, (ii) agreed to changes in subscriptions upon the occurrence of corresponding conditions (e.g., subscription limits being reached), (iii) subscription limitations, and/or other information regarding subscriptions for user of managed systems. Managed system manager 170 may use such information to implement subscription, track when subscriptions are likely to be exceeded, and notify users of managed systems of impending subscription limitations that will be reached.

Use data repository 176 may be implemented with one or more data structures that store information regarding use of the services provided by one or more managed systems to users (e.g., that have agreed to various subscriptions for such use). The use data may include quantities of services utilized by a user (e.g., absolute quantities, use rates, and/or other types of information regarding use of such services by subscribed entities), quantities of computing resources consumed by services provided to a user, and/or other information usable to quantify use of managed systems or services provided by the managed systems.

Use data reporting management repository 178 may be similar to use data reporting management repository 168, but may include such information for any number of different managed systems (e.g., whereas use data reporting management repository 168 may only include information for the host managed system).

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to subscription management service 10 (e.g., in a cloud resource, etc.) in a manner that is still accessible to subscription management service 10.

While illustrated in FIG. 1D with a limited number of specific components, a local subscription manager may include additional, fewer, and/or different components without departing from embodiments disclosed herein.

As discussed above, the components of FIG. 1A may perform various methods to provide computer implemented services using managed systems. FIGS. 2-3 illustrate examples of methods that may be performed by the components of FIG. 1A. For example, a subscription management service, a local subscription manager of a host managed system, and/or a managed system may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of reporting use data to facilitate management of a host managed system in accordance with an embodiment is shown.

At operation 200, a rate of use of a managed system and a total quantity of use of the managed system is monitored. The monitoring may be performed may monitoring use of services provided by a host managed system by a user (e.g., which is subscribed for such use), use of hardware devices of the host managed system for providing the services, and/or via other types of monitoring.

In an embodiment, the rate of use of the managed system may be monitored, for example, by measuring a transaction per second rate, an operations per second rate, and/or other types of rate based metrics associated with the host managed system associated with use of the managed system by a user. The obtained rates may be aggregated and/or otherwise combined or used to identify a rate of use of the managed system by the user.

In an embodiment, the total quantity of use of the managed system may be monitored, for example, by measuring transactions, operations, and/or other types of metrics associated with the host managed system that are associated with use of the managed system by a user. The metrics may be monitored over periods of time corresponding to subscription limitations to identify whether a subscription limitation has been exceeded. For example, if a subscription limitation is based on transactions, the transactions over time may be summed and compared to the subscription limitation.

At operation 202, a determination is made regarding whether the total quantity of use is within a subscription limitation (e.g., that is based on the total quantity of use). The determination may be made by comparing the total quantity of use to a range (e.g., of use) associated with the subscription limitation. If the total quantity of use by the user is within the range, then it may be determined that the total quantity of use of the managed system by the user exceeds the subscription limitation.

For example, consider a scenario where a subscription limitation specifies a limitation of storage of ten gigabytes of data by a user. The range may be nine to ten gigabytes. If the total quantity of stored data by the user is greater than nine gigabytes, then it may be determined that the subscription limit has been exceeded. Information regarding the subscription limitations and corresponding ranges may be stored in a repository hosted by a local subscription manager tasked with reporting use data.

If it is determined that the total quantity of use of the managed system by a user is within the subscription limitation, then the method may proceed to operation 204. Otherwise, the method may proceed to operation 208. Proceeding to operation 208 may indicate that the user is likely to exceed a limitation in the future. Consequently, the local subscription manager may automatically modify the reporting interval to ensure that the user has up to date information usable to make subscription update decisions, as discussed below with respect to operation 208. In contrast, proceeding to operation 204 may indicate that the user is unlikely to exceed subscriptions. Consequently, reduction in overhead for reporting use data may be prioritized over ensuring that the user is provided with the most up to date information regarding their use of a managed system, as discussed below with respect to operation 204.

At operation 204, a reporting interval is updated based on the rate of use of the managed system. For example, a lookup may be performed using the rate of use of the managed system. The lookup may return the reporting interval. Generally, the lookup data structure may indicate longer reporting intervals with reduced rates of use of the managed system and shorting reporting intervals with increased rates of use of the managed system.

By updating the reporting interval, the rates of reporting may be dynamically modified to conserve computing resources for use data reporting. Consequently, the managed system may have additional resources available for providing services, the network environment in which the managed system resides may be less encumbered with traffic used to communicate use data, etc.

At operation 206, intermittent reporting of use of the managed system is performed based on the reporting interval (e.g., as updated in operation 204 or modified in operation 208). The intermittent reporting may be performed by generating reports of use of the managed system by the user for intervals defined by the reporting interval, and providing the reports to the subscription management service. Consequently, as the reporting interval increases, fewer reports may be generated and transmitted thereby reducing overhead for reporting. In contrast, as the reporting interval decreases, additional reports may be generated and transmitted thereby improving the accuracy of the subscription management's service's picture of the use of the managed system by the user.

The generated reporting may include any type and quantity of information regarding the use of the managed system by the user.

The method may end following operation 206.

Returning to operation 202, the method may proceed to operation 208 following operation 202 when it is determined that the total quantity of use exceeds the subscription limitation (e.g., falls within the corresponding range).

At operation 208, a reporting interval is modified based on a predetermined reporting rate regardless of the rate of the use of the managed system.

In an embodiment, the predetermined reporting rate is a maximum reporting rate which may result in a minimum reporting interval (e.g., time between reports). The modified reporting interval may be stored locally for future use.

In an embodiment, the predetermined reporting rate is identified by performing a lookup in a lookup data structure using the subscription limitation as a key. The lookup data structure may provide the predetermined reporting rate. In other words, in some embodiments, the predetermined reporting rate may vary depending on the subscription limitation that is likely to be exceeded. Some subscription limitations may be associated (with the lookup data structure) with high predetermined reporting rates while other subscription limitations may be associated with lower predetermined reporting rates.

Thus, the predetermined reporting rate may result in a modified reporting interval that is far shorter than that which would be selected via operation 204 which may utilize the rate of use of the managed system as the basis for selecting the updated reporting interval.

The method may proceed to operation 206 following operation 208.

Thus, using the method illustrated in FIG. 2, a system in accordance with embodiments may facilitate dynamic reporting of use of a managed system such that the managed system may be better managed while reducing overhead for the reporting.

The method illustrated in FIG. 2 may be repeated and/or performed in parallel for any number of user and managed systems to facilitate dynamic reporting across a range of managed systems. Consequently, any number of managed system may implement similar or different reporting intervals depending on their implemented subscriptions and use of the respective managed systems.

Turning to FIG. 3, a flow diagram illustrating a method of managing operation of a distributed system in accordance with an embodiment is shown. The method may be performed, in part or entirely, by a subscription management services, local subscription managers hosted by managed systems, and/or managed systems.

Prior to and/or concurrently with operation 300, the method illustrated in FIG. 2 may be performed to report to a subscription manager use data. The subscription manager may report the use of the managed systems, subscription limitations, and/or other information usable by the users to make subscription management decisions. The users may, responsive to the intermittently reported use data, request that subscription updates be made. The subscription management service may implement the subscription updates for the managed systems.

At operation 300, a subscription update responsive to intermittent reporting of use of a managed system is obtained. The subscription update may be obtained by a local subscription manager hosted by the managed system and from the subscription management service. The subscription update may indicate a subscription change that will decrease the likelihood of use of the managed system exceeding an existing subscription limitation.

The subscription update may be responsive to the intermittent reporting by indicating a subscription change that modifies a subscription limitation that was likely to be exceeded as indicated by the intermittent reporting to no longer be likely to be exceeded.

At operation 302, operation of the managed system is updated based on the subscription update. The operation may be updated by, for example and based on the subscription update, (i) enabling/disabling hardware components, (ii) adding/removing software components, (iii) changing configuration settings, and/or (iv) updating a subscription information repository to update the subscription limitation based on the subscription update.

The method may end following operation 302.

Turning to FIGS. 4A-4B, example actions and interactions between user device 400, subscription management service 410, and managed system 420 in accordance with an embodiment are shown. Like named components in FIGS. 4A-B and FIG. 1A may be similar. Generally, operations performed by these components are illustrated as boxes positioned on the line descending from each of the boxes at the top of the respective page denoting each respective component. Interactions between the components are illustrated using arrow extending between the lines (or boxes positioned thereon) descending from each of the boxes at the top of the respective page denoting each respective components.

User device 400 (e.g., a cell phone, laptop computer, tablet computer, etc.) may be a device utilized by a person tasked with managing managed system 420. To manage managed system 420, the user may provide, at block 430 and through user device 400, a subscription update request to subscription management service 410. The user may do so via a webpage displayed on user device 400 and driven by subscription management service 410.

The subscription update request may specify that database services are to be provided by managed system 420 with a limit of ten gigabytes of storage space. In response to receiving subscription update request, at block 432, subscription management service 410 may generate and send a subscription update to managed system 420. The subscription update may specify, in part, an action (e.g., enablement action) to deploy appropriate software to provide the database services and dedicate ten gigabytes of storage space.

Managed system 420, in response to receiving subscription update and at block 434, may perform one or more subscription enablement actions such as powering a storage device, allocating ten gigabytes of storage, and deploying a database instance using the storage space. Managed system 420 may also, at block 436, update a subscription information repository to reflect the ten gigabyte limit of the subscription (which may also indicate that use data for storing data in the database should be reported to subscription management service 10). For example, an entry specifying ten gigabytes of data for the user of user device 400. Managed system 420 may also store information regarding a range of nine to ten gigabytes associated with the ten gigabyte subscription limitation.

Following the update of the subscription information repository, the local subscription manager of managed system 420 may monitor the operation of managed system 420 to identify if the subscription limit of gigabyte has been exceeded, report the measured use data regarding the storage space actually consumed to subscription management service 410, and may automatically perform disablement actions if the ten gigabyte limit is reached (which may deprive the user of user device 400 of continued use of the database services, which may not be desired).

Once implemented, managed system 420 may, at block 438, send a notification to subscription management service 410 indicating the database services are being provided to the user. While not shown, in FIG. 4A, the user may begin to use the database services which may cause data to begin to be stored in managed system 420.

Turning to FIG. 4C, a plot diagram illustrating an example of use of storage for the data base services. In the plot, time is shown on across the page and total use of storage for the database is shown from top to bottom. The total use 485 of storage for the database over time is illustrated using a short dashed line. Subscription limitation 480 drawn with a long dashed line indicates the ten gigabyte subscription limitation and subscription limit range 482 drawn with a long and shorted dashed line indicates the range (e.g., between the two lines) associated with subscription limit 480.

As seen in the plot, between 0 time and time T1, large amounts of data initially begin to be stored in the database (e.g., by virtue of the large slope of the line).

Returning to the discussion of FIG. 4A, in response to the notification, at block 440, subscription management service 410 may implement use monitoring for managed system 420. To do so, subscription management service 410 may, in block 442, send a reporting configuration for managed system 420 which may define when measured use data is to be reported to subscription management service 410.

In response, at block 444, managed system 420 may implement dynamic use data reporting which may dynamically select the reporting interval, as discussed with respect to FIG. 2.

Returning to the discussion of FIG. 4C, from time 0 to T1, the rate of use of the managed system is high and the total use is not within the range, consequently, the reporting interval is dynamically set to a small value based on the rate of storage of data in the database.

At time T1 and extending through time T4, the rate of storage of data slows and the total use is not within the range (e.g., between the long dashed and long dashed-dotted lines), consequently, the reporting interval is dynamically set to a larger value based on the rate of storage of data in the database.

Returning to the discussion of FIG. 4A, consequently, at blocks 446-448, managed system may begin reporting use data to subscription management service 410 based on the corresponding reporting intervals.

At block 440, subscription management service 410 may begin to perform reporting of use of storage space of managed system 420 to the user of user device 400. To do so, subscription management service 410 may, at blocks 454-456 (shown in FIG. 4B) generate corresponding reports to the user. These reports may only be as timely or up to date as the use data reported by managed system 420.

Returning to the discussion of FIG. 4C, at time T4 and extending forward, the rate of use of the managed system remains low but the total use falls within the range, consequently, the reporting interval is modified to the predetermined reporting rate. In this example scenario, the predetermined reporting rate is that maximum supported by managed system 420.

Turning to FIG. 4B, at block 445, accelerated use data reporting is performed by the managed system based on the modified reporting interval. Consequently, at blocks 450-452, the use data is reported by managed system 420 to subscription management service 410 much more regularly. Consequently, subscription management service 410 is kept more up to date regarding the actual use of managed system 420, at the cost of increased overhead for the reporting.

Using the more up to date information, subscription management service 410, at blocks 458-460, is able to report the use of managed system 420 more accurately (e.g., less stale).

Consequently, the user of user device 400 is appraised that the ten gigabyte subscription limitation will likely be reached. By virtue of the more up to date information, the user is able to use user device 400, at block 462, to submit a subscription update request to subscription management service 410 to increase the storage limitation to twenty gigabytes. Consequently, at block 464, when subscription management service 410 implements the subscription update, the local subscription manager of managed system 420 is able to ascertain that the reporting interval may return to being based on the rate of use thereby facilitating reduced computational overhead.

For example, returning to the discussion of FIG. 4C, at time T5 managed system 420 may update its subscription limitation based on the subscription. As seen in FIG. 4C, updated subscription limit 481 and update subscription limit range 483 are well above total use 485. Thus, the intervals may return to being selected on the basis of the rate of use of managed system 420 rather than on whether a subscription limit is likely to be exceeded.

Thus, as seen in FIGS. 4A-4C, management of managed system 420 may be continued effectively even while reduce quantities of computing resources are dedicated for use data reporting. Consequently, a system in accordance with embodiments disclosed herein may facilitate effective reporting with reduced computing overhead thereby facilitating increased performance.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

Further, by providing reporting functionality using a dynamic reporting model, the overhead for managing a distributed system may be reduced while empowering user of the managed system to ensure that they are able to receive desired services. For example, by dynamically reducing the rates of reporting during period of time when subscriptions are unlikely to be exceeded, the user of the managed system may be provided with a reasonable view of their use of the managed systems while reducing computational overhead thereby allowing the managed system to provide additional and/or improved services. During periods of time when subscription may be exceeded, the reporting rates may be automatically increased so that users have a more up to date view of their use of the managed systems. Consequently, the users may be empowered to make appropriate subscription elections in a timely manner to avoid subscription limitations being reach which may, thereby, deprive users of desired services.

As discussed above, various components may be implemented with computing devices. For example, any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for managing a distributed system comprising managed systems and a subscription manager that manages operation of the managed systems, the method comprising:
performing intermittent reporting, by a first managed system of the managed systems and of a use of the first managed system, to the subscription manager using a first reporting time interval to provide reports of the use of the first managed system;
while performing the intermittent reporting:
monitoring, by the first managed system, a rate of the use of the first managed system and a total quantity of use of the first managed system;
modifying, by the first managed system, the first reporting time interval based on the rate of the use of the first managed system and the total quantity of use of the first managed system to obtain an updated first reporting time interval used to perform the intermittent reporting, the updated first reporting time interval increasing or decreasing time between the reports of the use of the first managed system;
obtaining, by the first managed system, a subscription update for a subscription, the subscription update being responsive to the intermittent reporting; and
modifying, by the first managed system, operation of the first managed system based on the subscription update,
wherein the modifying of the first reporting time interval based on the rate of the use of the first managed system and the total quantity of use of the first managed system to obtain the updated first reporting time interval used to perform the intermittent reporting further comprises:
while the total quantity of use of the first managed system is in a range associated with a subscription limitation of the subscription:
modifying the first reporting time interval to obtain, as the updated first time reporting interval, a modified first reporting time interval to meet a predetermined reporting rate regardless of the rate of the use of the first managed system to provide reports of the use of the first managed system at the predetermined reporting rate; and
storing the modified first reporting time interval in a storage of the of the first managed system.

2. The computer-implemented method of claim 1, wherein the subscription limitation specifies an authorized quantity of the use of the first managed system based on the subscription, and the range is based on quantities of use of the first managed system that indicate that the subscription limitation is likely to be exceeded.

3. The computer-implemented method of claim 1, wherein meeting the predetermined reporting rate reduces the first reporting time interval, once the first reporting time interval is modified into the modified first reporting time interval, to a minimum reporting interval.

4. The computer-implemented method of claim 1, wherein the intermittent reporting is performed by an out-of-band management controller hosted by the first managed system, the out-of-band management controller managing functionality of the first managed system, and wherein the first managed system is accessible by a user based, at least in part, on the subscription.

5. The computer-implemented method of claim 4, wherein the out-of-band management controller operates independently from the first managed system.

6. The computer-implemented method of claim 2, wherein the modifying of the first reporting time interval based on the rate of the use of the first managed system and the total quantity of use of the first managed system to obtain the updated first reporting time interval used to perform the intermittent reporting further comprises:
while the total quantity of use of the first managed system is within a subscription limitation of the subscription but outside of the range:
decreasing the first reporting time interval to obtain, as the updated first reporting time interval, a decreased first reporting time interval in response to corresponding increases in the rate of the use of the first managed system to increase a computing resource expenditure associated with the reports of the use of the first managed system; or
increasing the first reporting time interval to obtain, as the updated first reporting time interval, an increased first reporting time interval in response to corresponding decreases in the rate of the use of the first managed system to decrease a computing resource expenditure associated with the reports of the use of the first managed system.

7. The computer-implemented method of claim 1, wherein a newly modified first reporting time interval is stored in the storage of the first managed system each time the modified first reporting time interval is subsequently modified.

8. A non-transitory machine-readable medium having instructions stored therein, which when executed by a processor, cause the processor to perform operations for managing a distributed system comprising managed systems and a subscription manager that manages operation of the managed systems, the operations comprising:
performing intermittent reporting, by a first managed system of the managed systems and of a use of the first managed system, to the subscription manager using a first reporting time interval to provide reports of the use of the first managed system;
while performing the intermittent reporting:
monitoring, by the first managed system, a rate of the use of the first managed system and a total quantity of use of the first managed system;
modifying, by the first managed system, the first reporting time interval based on the rate of the use of the first managed system and the total quantity of use of the first managed system to obtain an updated first reporting time interval used to perform the intermittent reporting;
obtaining, by the first managed system, a subscription update for a subscription, the subscription update being responsive to the intermittent reporting; and
modifying, by the first managed system, operation of the first managed system based on the subscription update,
wherein the modifying of the first reporting time interval based on the rate of the use of the first managed system and the total quantity of use of the first managed system to obtain the updated first reporting time interval used to perform the intermittent reporting further comprises:
while the total quantity of use of the first managed system is in a range associated with a subscription limitation of the subscription:
modifying the first reporting time interval to obtain, as the updated first reporting time interval, a modified first reporting time interval to meet a predetermined reporting rate regardless of the rate of the use of the first managed system to provide reports of the use of the first managed system at the predetermined reporting rate; and
storing the modified first reporting time interval in a storage of the first managed system.

9. The non-transitory machine-readable medium of claim 8, wherein the subscription limitation specifies an authorized quantity of the use of the first managed system based on the subscription, and the range is based on quantities of use of the first managed system that indicate that the subscription limitation is likely to be exceeded.

10. The non-transitory machine-readable medium of claim 8, wherein meeting the predetermined reporting rate reduces the first reporting time interval, once the first reporting time interval is modified into the modified first reporting time interval, to a minimum reporting interval.

11. The non-transitory machine-readable medium of claim 8, wherein the intermittent reporting is performed by an out-of-band management controller hosted by the first managed system, the out-of-band management controller managing functionality of the first managed system, and wherein the first managed system is accessible by a user based, at least in part, on the subscription.

12. The non-transitory machine-readable medium of claim 11, wherein the out-of-band management controller operates independently from the first managed system.

13. The non-transitory machine-readable medium of claim 9, wherein the modifying of the first reporting time interval based on the rate of the use of the first managed system and the total quantity of use of the first managed system to obtain the updated first reporting time interval used to perform the intermittent reporting further comprises:
while the total quantity of use of the first managed system is within a subscription limitation of the subscription but outside of the range:
decreasing the first reporting time interval to obtain, as the updated first reporting time interval, a decreased first reporting time interval in response to corresponding increases in the rate of the use of the first managed system to increase a computing resource expenditure associated with the reports of the use of the first managed system; or
increasing the first reporting time interval to obtain, as the updated first reporting time interval, an increased first reporting time interval in response to corresponding decreases in the rate of the use of the first managed system to decrease a computing resource expenditure associated with the reports of the use of the first managed system.

14. The non-transitory machine-readable medium of claim 8, wherein a newly modified first reporting time interval is stored in the storage of the first managed system each time the modified first reporting time interval is subsequently modified.

15. A data processing system, comprising:
a memory; and
a processor that performs operations for managing a distributed system comprising managed systems and a subscription manager that manages operation of the managed systems, the operations comprising:
performing intermittent reporting, by a first managed system of the managed systems and of a use of the first managed system, to the subscription manager using a first reporting time interval to provide reports of the use of the first managed system;
while performing the intermittent reporting:
monitoring, by the first managed system, a rate of the use of the first managed system and a total quantity of use of the first managed system;
modifying, by the first managed system, the first reporting time interval based on the rate of the use of the first managed system and the total quantity of use of the first managed system to obtain an updated first reporting time interval used to perform the intermittent reporting;
obtaining, by the first managed system, a subscription update for a subscription, the subscription update being responsive to the intermittent reporting; and
modifying, by the first managed system, operation of the first managed system based on the subscription update,
wherein the modifying of the first reporting time interval based on the rate of the use of the first managed system and the total quantity of use of the first managed system to obtain the updated first reporting time interval used to perform the intermittent reporting further comprises:

while the total quantity of use of the first managed system is in a range associated with a subscription limitation of the subscription:
 modifying the first reporting time interval to obtain, as the updated first reporting time interval, a modified first reporting time interval to meet a predetermined reporting rate regardless of the rate of the use of the first managed system to provide reports of the use of the first managed system at the predetermined reporting rate; and
 storing the modified first reporting time in a storage of the first managed system.

16. The data processing system of claim 15, wherein the subscription limitation specifies an authorized quantity of the use of the first managed system based on the subscription, and the range is based on quantities of use of the first managed system that indicate that the subscription limitation is likely to be exceeded.

17. The data processing system of claim 16, wherein the modifying of the first reporting time interval based on the rate of the use of the first managed system and the total quantity of use of the first managed system to obtain the updated first reporting time interval used to perform the intermittent reporting further comprises:
 while the total quantity of use of the first managed system is within a subscription limitation of the subscription but outside of the range:
  decreasing the first reporting time interval to obtain, as the updated first reporting time interval, a decreased first reporting time interval in response to corresponding increases in the rate of the use of the first managed system to increase a computing resource expenditure associated with the reports of the use of the first managed system; or
  increasing the first reporting time interval to obtain, as the updated first reporting time interval, an increased first reporting time interval in response to corresponding decreases in the rate of the use of the first managed system to decrease a computing resource expenditure associated with the reports of the use of the first managed system.

18. The data processing system of claim 15, wherein a newly modified first reporting time interval is stored in the storage of the first managed system each time the modified first reporting time interval is subsequently modified.

19. The data processing system of claim 15, wherein meeting the predetermined reporting rate reduces the first reporting time interval, once the first reporting time interval is modified into the modified first reporting time interval, to a minimum reporting interval.

20. The data processing system of claim 15, wherein the intermittent reporting is performed by an out-of-band management controller hosted by the first managed system, the out-of-band management controller managing functionality of the first managed system, and wherein the first managed system is accessible by a user based, at least in part, on the subscription.

* * * * *

UNITED STATES PATENT AND TRADEMARK OFFICE
CERTIFICATE OF CORRECTION

| | | |
|---|---|---|
| PATENT NO. | : 11,632,315 B1 | Page 1 of 1 |
| APPLICATION NO. | : 17/579173 | |
| DATED | : April 18, 2023 | |
| INVENTOR(S) | : Vinay Sawal et al. | |

It is certified that error appears in the above-identified patent and that said Letters Patent is hereby corrected as shown below:

On the Title Page

Item (12) the listed inventorship - Sawai et al. - should read -- Sawal et al. --

Inventors item (72) the first inventor's name - Vinay Sawai - should read -- Vinay Sawal --

Signed and Sealed this
Sixth Day of June, 2023

*Katherine Kelly Vidal*

Katherine Kelly Vidal
*Director of the United States Patent and Trademark Office*